US006695466B2

(12) United States Patent
Naganawa et al.

(10) Patent No.: US 6,695,466 B2

(45) Date of Patent: Feb. 24, 2004

(54) HEADLAMP

(75) Inventors: Masahito Naganawa, Shizuoka (JP); Tomoyuki Moritani, Shizuoka (JP); Akinori Matsumoto, Shizuoka (JP); Takayuki Iwaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/975,449

(22) Filed: Oct. 11, 2001

(65) Prior Publication Data

US 2002/0044453 A1 Apr. 18, 2002

(30) Foreign Application Priority Data

Oct. 12, 2000 (JP) .................................... P2000-311882
Oct. 5, 2001 (JP) .................................... P2001-310047

(51) Int. Cl.[7] ................................................ B60Q 1/04

(52) U.S. Cl. ....................................... 362/539; 362/280

(58) Field of Search ................................ 362/280, 282, 362/284, 285, 286, 319, 386, 418, 512, 514, 523, 539

(56) References Cited

U.S. PATENT DOCUMENTS

| | | | | |
|---|---|---|---|---|
| 1,552,188 A | * | 9/1925 | Atkinson | 362/539 |
| 2,119,597 A | * | 6/1938 | Morea | 362/284 |
| 4,663,696 A | | 5/1987 | Miyazawa et al. | |
| 4,827,388 A | | 5/1989 | Miyazawa | |
| 5,488,546 A | | 1/1996 | Sato et al. | |
| 5,528,475 A | | 6/1996 | Takahashi et al. | |
| 5,673,990 A | | 10/1997 | Neumann et al. | |
| 5,971,574 A | * | 10/1999 | Taniuchi et al. | 362/286 |
| 6,161,950 A | | 12/2000 | Tsukamoto et al. | |
| 6,179,455 B1 | * | 1/2001 | Taniuchi | 362/507 |
| 6,286,985 B1 | | 9/2001 | Ohshio et al. | |
| 2001/0015896 A1 | | 8/2001 | Tsukamoto | |

FOREIGN PATENT DOCUMENTS

| | | |
|---|---|---|
| DE | 196 42 467 | 4/1998 |
| GB | 2 332 741 A | 6/1999 |

OTHER PUBLICATIONS

WPI Abstract No. 2000–55308 & JP2000215717 A.
WPI Abstract No. 1996–021253 & DE4419365 A.
Examination Report Under Section 18(3), British Patent Office, Oct. 22, 2002.

* cited by examiner

*Primary Examiner*—Y. My Quach-Lee
(74) *Attorney, Agent, or Firm*—Fish & Richardson P.C.

(57) ABSTRACT

In a headlamp having a single filament bulb or discharge bulb, there is provided a movable shade that can appear from a reflection mirror located above the single filament bulb. In a usual condition, the movable shade is pulled at the back of the reflection mirror located above the single filament bulb. Then, a light emitted from the single filament bulb is condensed by the reflection mirror and irradiates a very long distance thereby to make a high-speed traveling possible. On the contrary, when it is rainy or foggy, the movable shade is protruded in the front of the reflection mirror. Then, a part of a light emitted from the single filament bulb is shielded by the movable shade, and the road surface in 20–40 m front of the vehicle is darkened thereby to reduce surface reflection from the road surface.

4 Claims, 12 Drawing Sheets

HEADLAMP

BACKGROUND OF THE INVENTION

1. Field of the Invention

The present invention relates to a vehicle headlamp having a single filament bulb or discharge bulb, by which the optimum light irradiation range can be obtained at high-speed running time or in a bad weather.

2. Description of the Related Art

A headlamp of an automobile or the like irradiates usually a front range 2 as shown in FIG. 18. At this time, in order to prevent the light of the headlamp from dazzling driver's eyes of a vehicle on the opposite lane, in the irradiation range on the opposite lane side, the light from the light source is shielded by a shade or the like (not shown) arranged in the lamp.

If the road surface is irradiated with a strong light of the headlamp when a vehicle travels in the rain, there is a problem that by surface reflection from a road surface 4, a driver of the vehicle cannot confirm the condition of the front road surface very well or gives glare to an oncoming vehicle. Further, when fog is irradiated with a strong luminous flux 6 of the headlamp in the fog, the road surface on the downside of the luminous flux 6 is invisible. Therefore, there is a problem that even a white line on the road (a center line or a lane mark at the edge of the road) cannot be confirmed.

Therefore, in an automobile having a conventional headlamp, in the rain or fog, the light is diffused in the front wide range by a supplementary lamp such as a fog lamp or the like instead of the headlamp, and the front road surface portion on the both sides is mainly irradiated, whereby a driver of the vehicle is easy to see the front road surface and can see very well the road surface portion of the front both sides, and particularly a white line on the road to run on the road by the vehicle. Further, it is sometimes effective to reduce glare toward an oncoming vehicle.

However, there is a problem that provision of the above-mentioned supplementary lamp causes a high cost.

SUMMARY OF THE INVENTION

An object of the invention is to provide a headlamp which makes the front road surface portion on the both sides visible in the rain or fog and reduces glare toward an oncoming vehicle even by using only the headlamp without providing the supplementary lamp.

In order to solve the aforesaid problem, according to the first aspect of the invention, in a headlamp in which a light source and a reflection mirror that supports the light source are located in a light chamber comprising a transparent cover and a lamp body, a luminous distribution changing means is provided, which shields a part of light from the light source or changes the reflecting direction of the light, and a part of the front road surface is darkened by the luminous distribution changing means. Hereby, in the rain or fog, luminous flux from the headlamp is weakened by the luminous distribution changing means, and a part of the front road surface is darkened thereby to reduce surface reflection from this portion.

According to the second aspect of the invention, in the first aspect, as the aforesaid luminous distribution changing means, a movable shade that can appear in the front of a reflection mirror portion located upper than the light source is provided. Hereby, in the rain or fog, the movable shade is protruded in the front of the reflection mirror portion, and a part of the light emitted from the light source is shielded by the movable shade, whereby the luminous flux from the headlamp is weakened. Further, a part of the front road surface is darkened thereby to reduce the surface reflection from this portion.

According to the third aspect of the invention, a light extracting hole is provided for the reflection mirror portion located upper than the light source, and a movable reflector that can open and close the light extracting hole is provided as the aforesaid luminous distribution changing means. Hereby, in the rain or fog, the light extracting hole is opened thereby to let a part of the light emitted from the light source go backward of the reflection mirror, so that the luminous flux from the headlamp is weakened, and a part of the front road surface is darkened thereby to reduce the surface reflection from this portion similarly to the first aspect of the invention.

According to the fourth aspect of the invention, in the first aspect, a part of the front road surface is a road surface portion in 20–40 m front of a vehicle. Hereby, in the rain or fog, the luminous flux from the headlamp is weakened by the luminous distribution changing means, and the front road surface in 20–40 m front of the vehicle is darkened thereby to reduce the surface reflection from this portion.

According to the fifth aspect of the invention, in the first aspect, as the aforesaid luminous distribution means, there is provided a moving means that moves the light source to a focal position of the reflection mirror and to a position distant from the focal position. Hereby, in the rain or fog, by separating the light source from the focal point of the reflection mirror, and the light emitted from the light source is diffused to the surroundings, so that a part of the front road surface is darkened thereby to reduce the surface reflection from this portion and to lighten the road surface portion of the both sides.

According to the sixth aspect of the invention, in the first aspect, a reflection part for irradiating a lane mark is provided for a part of the aforesaid reflection mirror, and when a part of the front road surface is darkened by the aforesaid luminous distribution changing means, the reflection light from its reflection part is emitted forward. Hereby, when it is rainy or foggy, even if a part of the front road surface is darkened in order to reduce the surface reflection from a part of the front road surface, the lane mark can be irradiated brightly.

According to the seventh aspect of the invention, in the first aspect, a part of the front road surface is located before a portion in 20 m front of a vehicle. Hereby, when it is rainy or foggy, a portion before the portion in 20 m front of the vehicle is darkened by the luminous distribution changing means thereby to reduce the surface reflection that dazzles the driver's eyes of the vehicle on the opposite lane

DETAILED DESCRIPTION OF THE PREFERRED EMBODIMENT

Next, a mode for carrying out the invention will be described with reference to embodiments.

Figure 1:
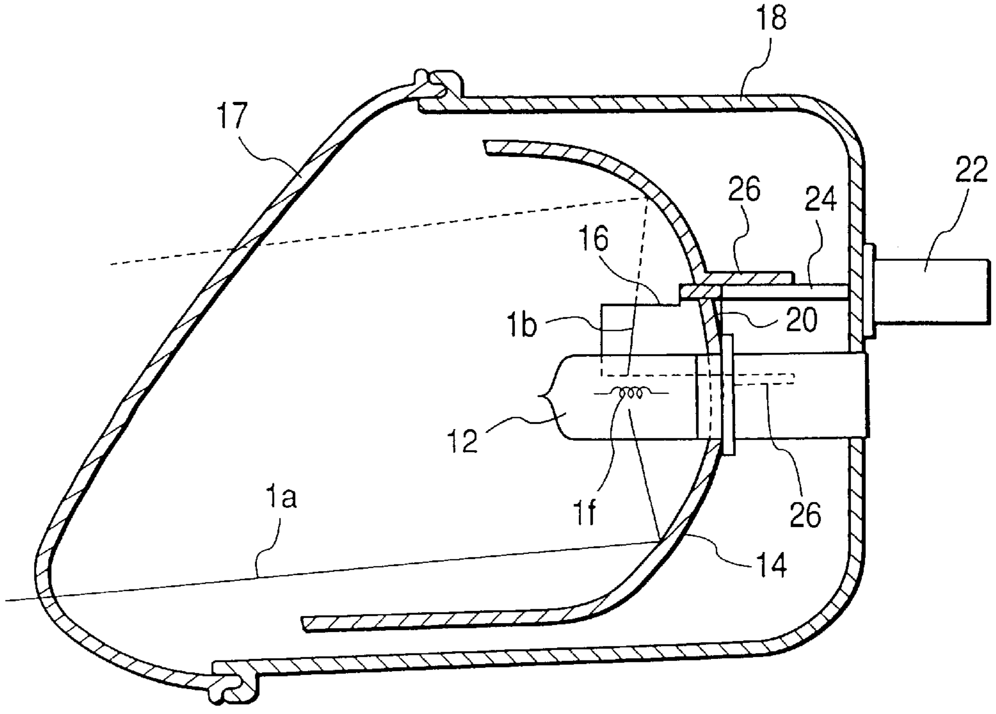
FIG. 1 is a longitudinal sectional view taken along a line I—I of FIG. 3, in a headlamp of a first embodiment used in the rain or fog.
Figure 2:
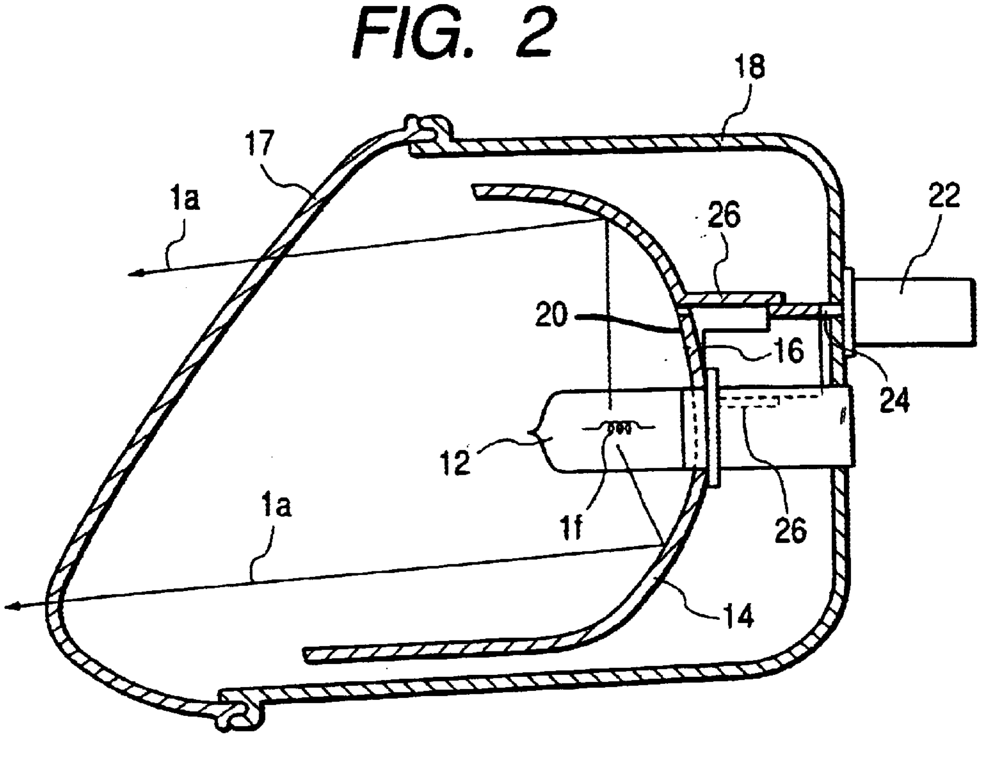
FIG. 2 is the same longitudinal sectional view in a usual condition.
Figure 3:
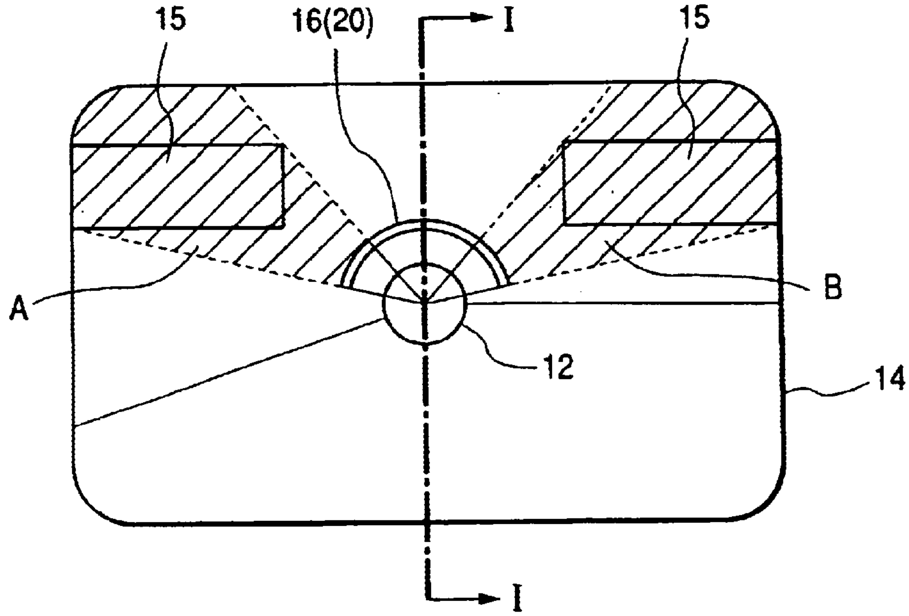
FIG. 3 is a front view of a reflection mirror of the headlamp in the first embodiment.

A first embodiment is shown in FIGS. 1 to 4. FIG. 1 is a longitudinal sectional view taken along a line I—I of FIG. 3, in a headlamp of this embodiment used in the rain or fog, FIG. 2 is the same longitudinal sectional view in a normal status, and FIG. 3 is a front view of a reflection mirror of the headlamp in this embodiment.

In this embodiment, a reflection mirror 14 provided with a single filament bulb 12 is arranged in a light chamber comprising a lamp body 18 and a transparent cover 17, the single filament bulb 12 is arranged so that its filament if is located at a focal point of the reflection mirror 14, and the reflection mirror 14 is supported within the lamp body 18 by an aiming means (not shown). This is the same as the structure in the conventional headlamp.

The reflection mirror 14 is so constituted as to generate a suitable low beam thereby to irradiate an irradiation range 2 in the front of a vehicle. Further, at a part of the reflection mirror 14, a diffusion step 15 is provided, which reflects the light nearby a road surface 4 in 20–40 m front of the vehicle.

Figure 4:
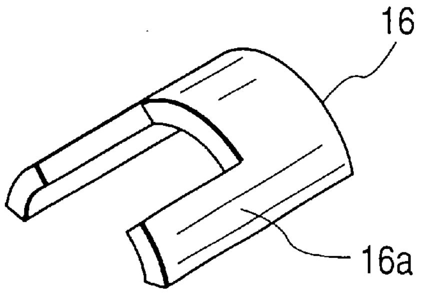
FIG. 4 is a perspective view of a movable shade used in the first embodiment.

Further, in this embodiment, as a luminous distribution changing means for shielding a part of light emitted from the single filament bulb 12 or for changing the reflecting direction of the light, a movable shade 16 is provided, which can appear from a slit 20 provided for the reflection mirror 14 located upward of the single filament bulb 12. The movable shade 16 is formed in the shape as shown in FIG. 4, and a pair of light shielding convex portion 16*a* protruding forward shields the light from the diffusion step 15, as shown in light shielding regions A and B.

The movable shade 16 is supported at the rear side of the reflection mirror 14 by a guide member 26 extending from the slit 20 backward, and coupled to a leading end of an output rod 24 of an actuator 22 fixed to the lamp body 18, whereby it can appear in the front of the reflection mirror 14 by action of the actuator. The actuator 22 may be any of an electromagnetic type, an electric motor type, an air pressure type, an oil pressure type, and the like. However, the electromagnetic type that moves the output rod 24 by an electromagnet can be realized with a smallest number of parts.

Of course, as long as the movable shade 16 can shield the light incident in the vicinity of the diffusion step 15, it may be formed in any shape, and may appear from any position in any direction. Further, a driver operates a switch (not shown) to operate the actuator 22, whereby the appearance of the movable shade 16 is performed simply and surely. However, the actuator 22 may be operated automatically by a weather sensor for detecting rain or fog.

Figure 18:
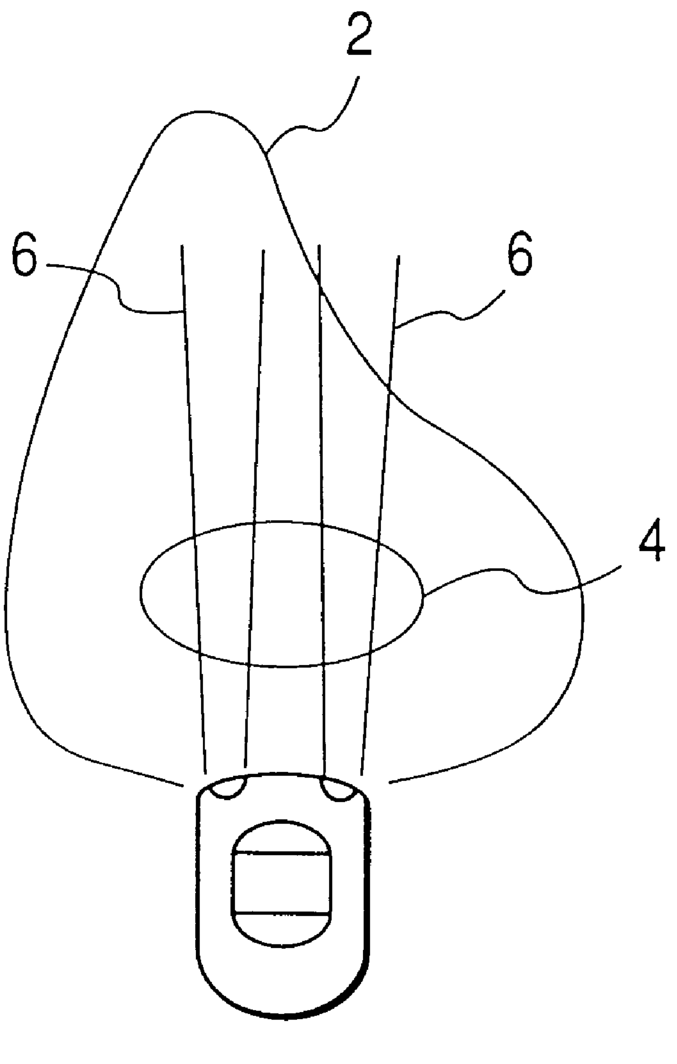
FIG. 18 is a diagram for explaining the surface irradiation state of a conventional headlamp and the headlamp in this invention.

In this embodiment, when it is fine or cloudy, i.e., in a usual condition, the movable shade 16 is pulled at the back of the reflection mirror 14 as shown in FIG. 2. Then, a light 1*a* emitted from the single filament bulb 12, without being shielded by the movable shade 16, is condensed by the reflection mirror 14 and irradiates a very long distance. Therefore, a high-speed traveling becomes possible. On the contrary, when it is rainy or foggy, as shown in FIG. 1, the movable shade 16 is protruded in the front of the reflection mirror 14. Then, a part of a light 1*b* emitted from the single filament bulb 12 is shielded by the movable shade 16 and is not irradiated forward as shown with a dotted line. Therefore, as shown in FIG. 18, the light incident on the road surface 4 is reduced, and a luminous flux 6 becomes weak as well. At this time, a position, a shape and a protruded amount of the movable shade 16 is determined so that the road surface 4 appropriately becomes dark in 20–40 m front of the vehicle.

According to this embodiment, in spite of the headlamp having the single filament bulb 12, when it is rainy or foggy, this headlamp can weaken the luminous flux 6 from the headlamp. Therefore, the driver can readily see the road surface of the both sides on the downside of the luminous flux 6. Further, since reflection from the road surface portion 4 in 20–40 m front of the vehicle, where reflection hinders a driver from viewing the forward condition the most, can be reduced, it is possible to reduce the surface reflection from this portion 4, and it is possible for the driver to see the forward road surface more readily. For this reason, in the case that the headlamp in this embodiment is used, even when it is rainy or foggy, the vehicle can run safely. Further, this improvement is economical.

Figure 5:
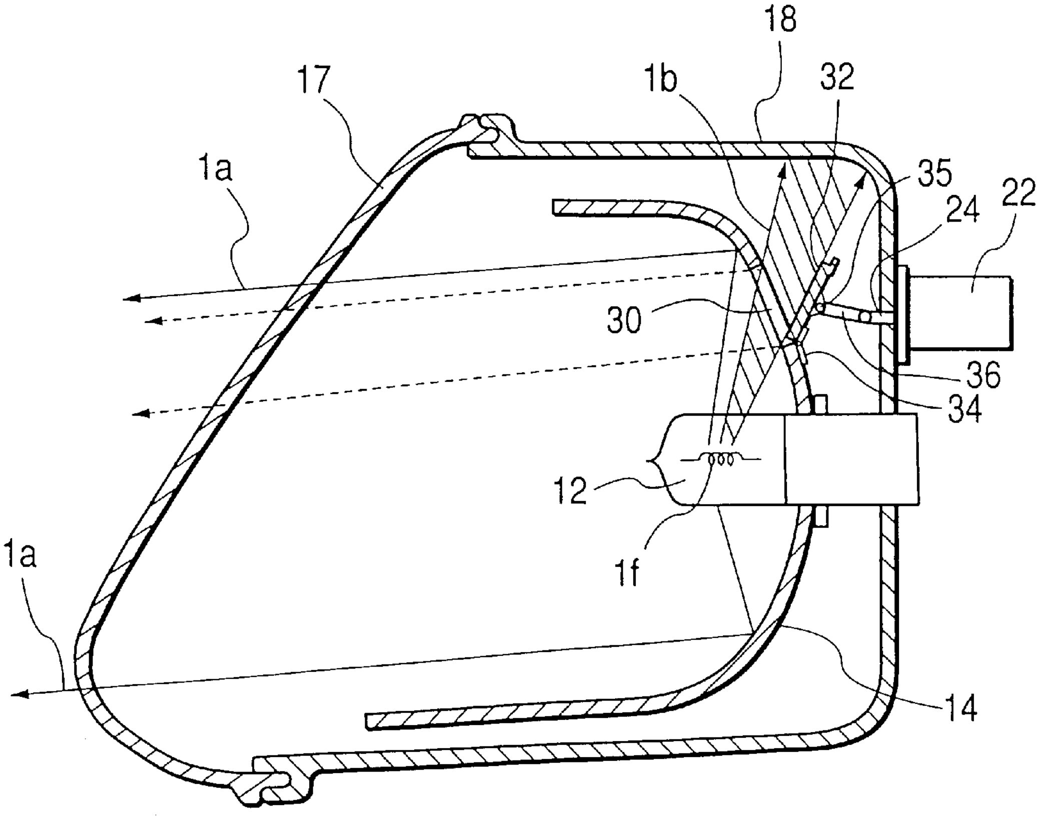
FIG. 5 is a longitudinal sectional view taken along a line II—II of FIG. 7, in a headlamp of a second embodiment used in the rain or fog.
Figure 6:
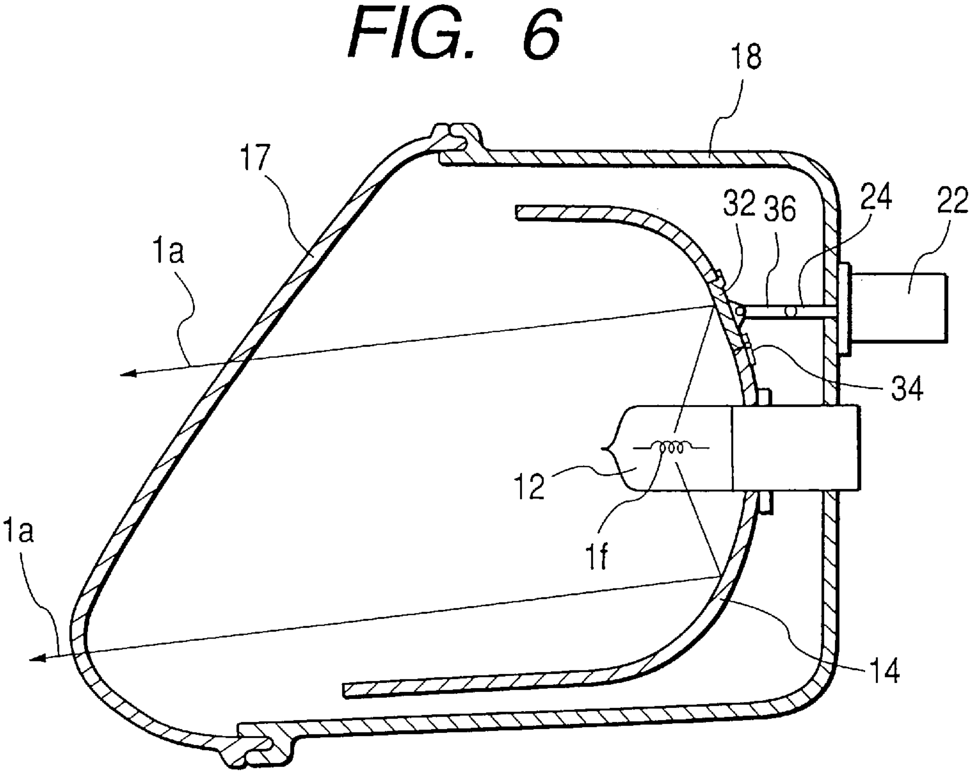
FIG. 6 is the same longitudinal sectional view in a usual condition.
Figure 7:
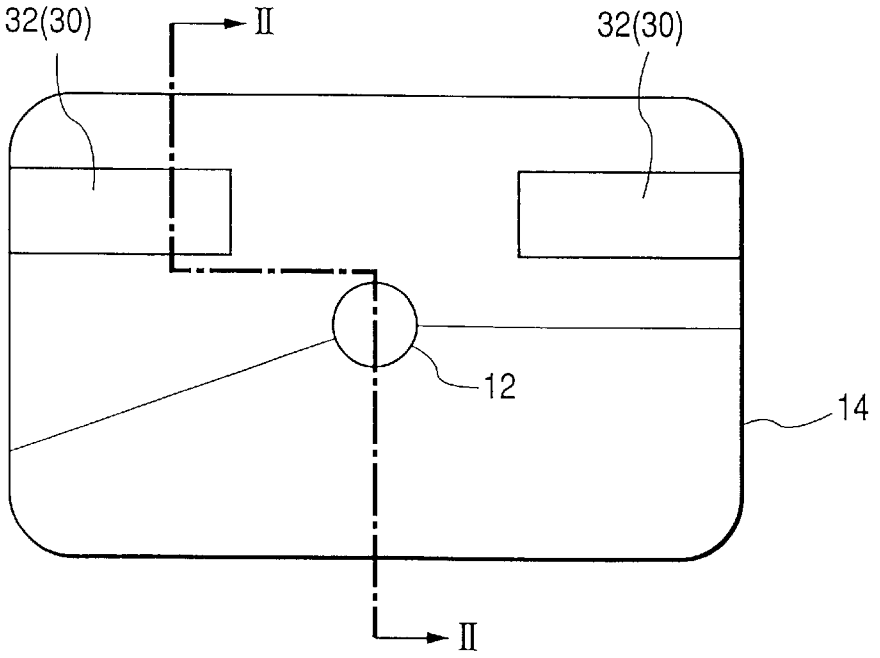
FIG. 7 is a front view of a reflection mirror of the headlamp in the second embodiment.

FIGS. 5 to 7 show a second embodiment. FIG. 5 is a longitudinal sectional view taken along a line II—II of FIG. 7, in a headlamp of this embodiment used in the rain or fog, FIG. 6 is the same longitudinal sectional view in a usual condition, and FIG. 7 is a front view of a reflection mirror of the headlamp in this embodiment.

In this embodiment, a light extracting hole 30 is provided for the reflection mirror 14 near the diffusion step 15 for reflecting the light to the portion 4 in 20–40 m front of the vehicle in the first embodiment, and a movable reflector 32 that can open and close the light extracting hole 30 is provided as a luminous distribution changing means that shields a part of the light emitted from a single filament bulb 12 or changes the reflecting direction of the light. One side of the movable reflector 32 is attached to a reflection mirror 14 by a hinge 34, and one end of a rod 36 is rotatably coupled to a bracket 35 on the rear surface on the other side thereof. The other end of the rod 36 is rotatably coupled to an output rod of an actuator 22, and the light-extracting hole 30 is opened and closed by action of the actuator 22.

The position, the shape, and the size of the light extracting hole 30, when the light extracting hole 30 is opened, are determined so that a road surface portion 4 in 20–40 m front of the vehicle becomes dark since a part 1*b* of the light emitted from the single filament bulb 12 is let go backward thereby not to irradiate the forward portion as shown by a dotted line. Except this point, this embodiment is the same as the first embodiment. Instead of by letting a part of the light go backward, a part of the light may irradiate a portion in the front of the road surface portion 4 by tilting the movable reflector 32 forward in order to darken the road surface portion 4. Also in this embodiment, by rotating the movable reflector 32 according to the weather, the same effects are obtained as the effects in the first embodiment.

Figure 8:
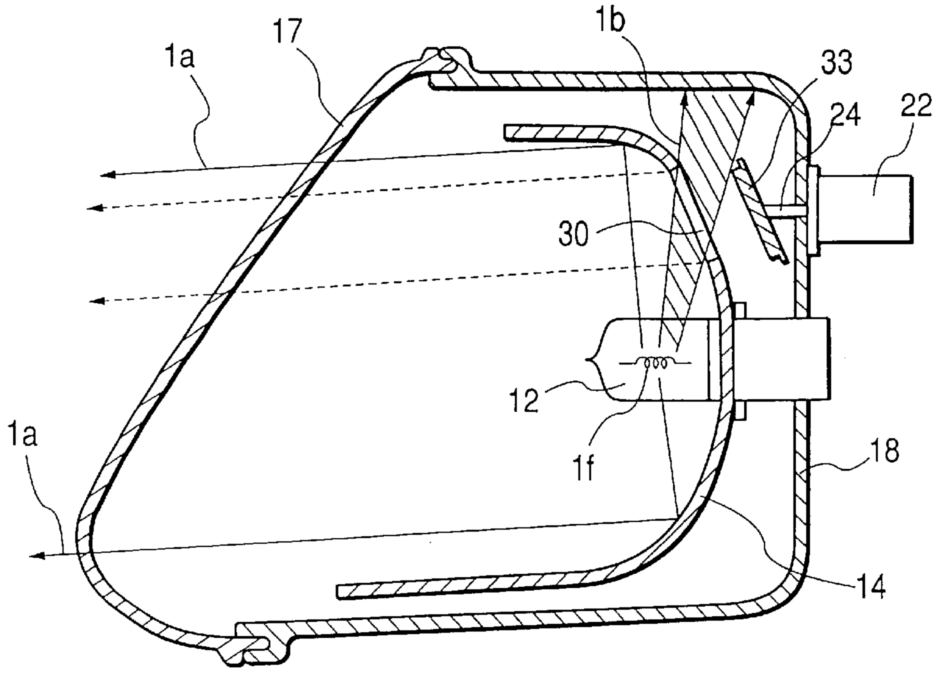
FIG. 8 is a longitudinal sectional view of a headlamp in a third embodiment used in the rain or fog.
Figure 9:
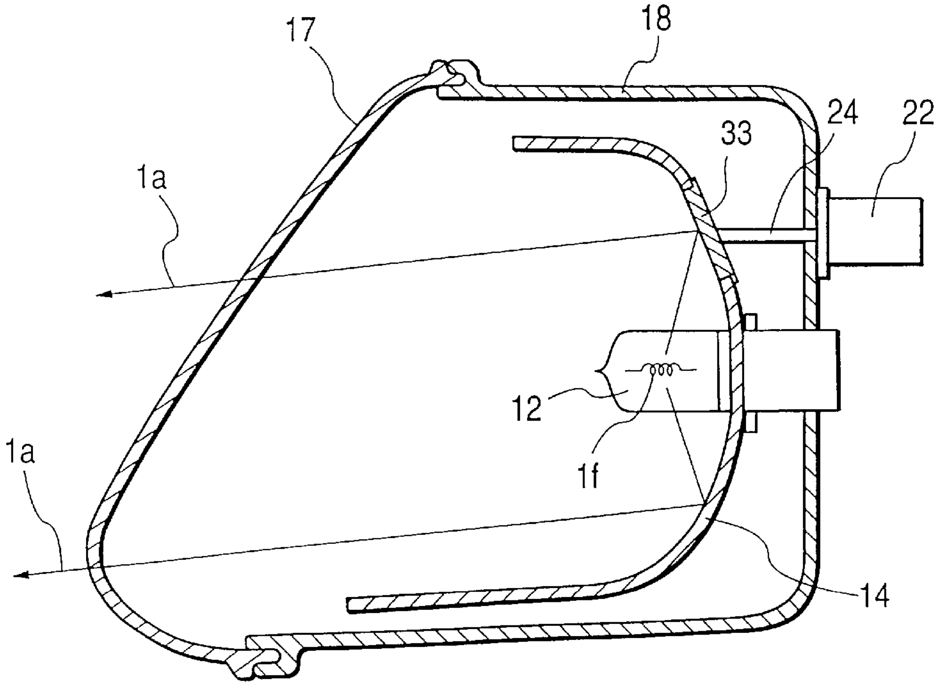
FIG. 9 is a longitudinal sectional view of the headlamp in the third embodiment used in a usual condition.

FIGS. 8 and 9 show a third embodiment. FIG. 8 is a longitudinal sectional view of a headlamp in this embodiment used in the rain or fog, and FIG. 9 is a longitudinal sectional view of the same used in a usual condition. Similarly to the second embodiment, in this embodiment, a light extracting hole 30 provided for a reflection mirror 14 located upward of a single filament bulb 12 is opened and closed by a movable reflector 33. However, this movable reflector 33 is directly fixed to an output shaft 24 of an actuator 22, and moved back and forth by action of the actuator 22. Except this point, the third embodiment is the same as the second embodiment. Also in this embodiment, by rotating the movable reflector 33 according to the weather, the same effects are obtained as the effects in the first or second embodiment.

Figure 10:
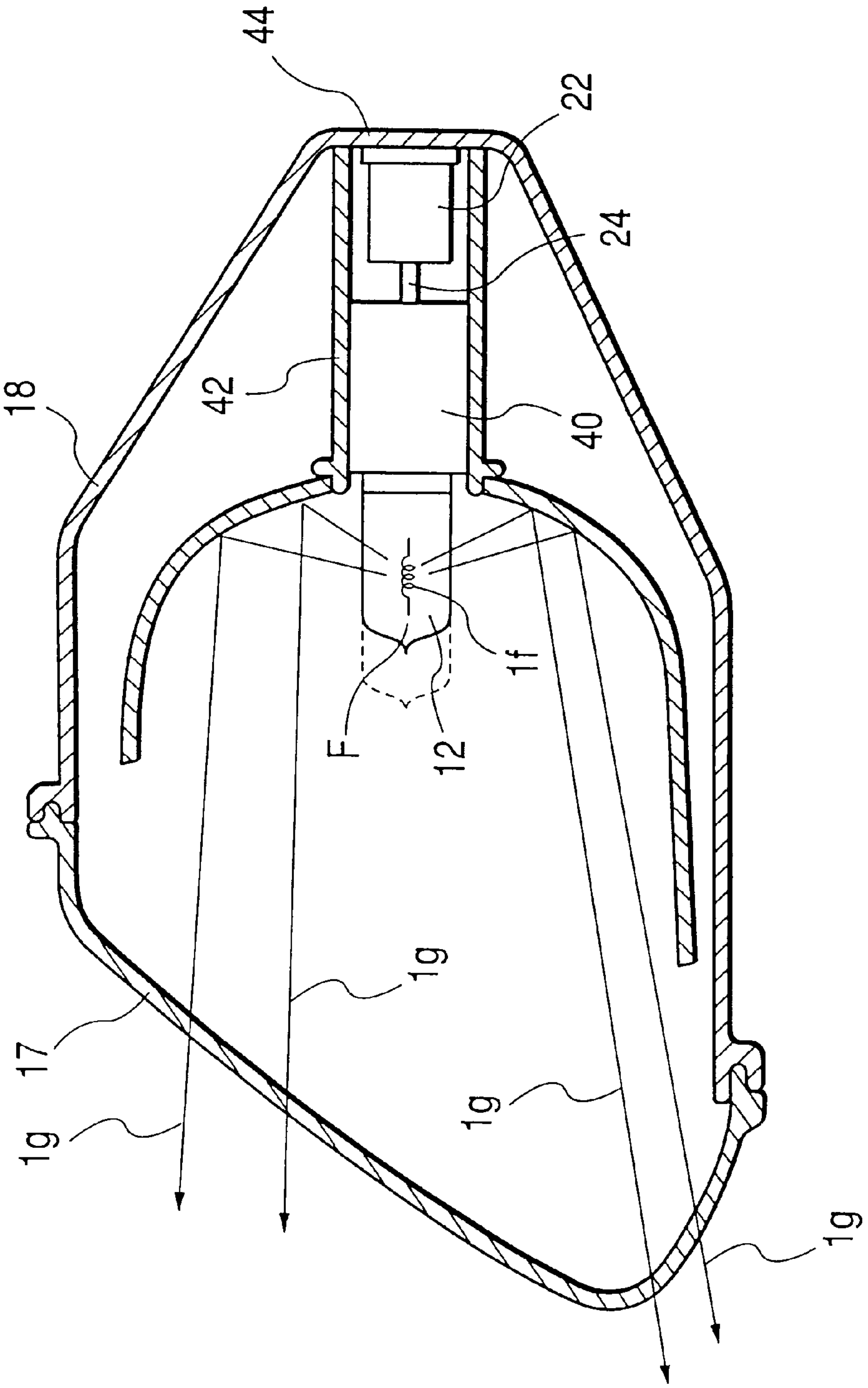
FIG. 10 is a longitudinal sectional view of a headlamp in a fourth embodiment used in the rain or fog.
Figure 11:
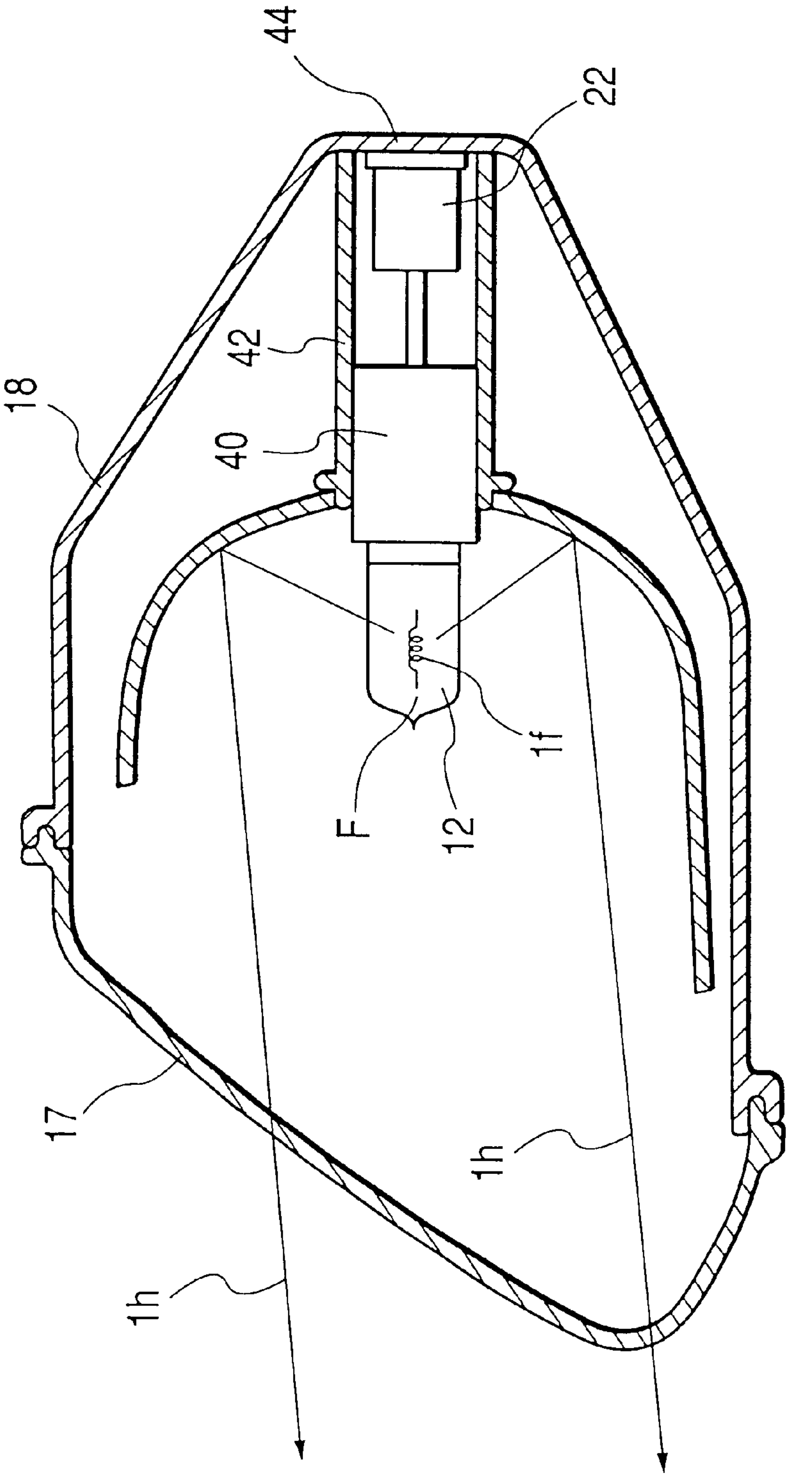
FIG. 11 is a longitudinal sectional view of the headlamp in the fourth embodiment used in a usual condition.
Figure 12:
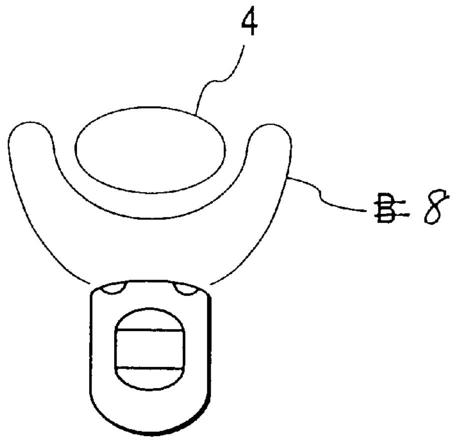
FIG. 12 is a diagram showing the surface irradiation state of the headlamp in the fourth embodiment.

FIGS. 10 to 12 show a fourth embodiment. FIG. 10 is a longitudinal sectional view of a headlamp in this embodiment used in the rain or fog, and FIG. 11 is a longitudinal sectional view of the same used in a usual condition. In this embodiment, a rear end portion 44 of a lamp body 18 is protruded backward, and a socket-supporting member 42 for supporting a socket 40 of a single filament bulb 12 is slidably fixed between this rear end portion 44 and a reflection mirror 14. Further, in this embodiment, as a luminous distribution changing means that shields a part of the light emitted from the single filament bulb 12 or changes the reflecting direction of the light, an actuator 22 that is a moving means for moving the single filament bulb 12 is fixed to the rear end portion 44 of the lamp body 18, and a leading end of an output rod 24 of the actuator 22 is secured to a rear portion of the socket 40. Therefore, the single filament bulb 12 can be moved back and forth along an optical axis of a reflection mirror 14 by action of the actuator 22.

In a usual condition, as shown in FIG. 11, the single filament bulb 12 is moved so that a filament 1*f* of the single filament bulb 12 is located at a focal point F of the reflection mirror 14. Then, a light 1*h* emitted from the single filament bulb 12 is condensed into a nearly parallel ray by the reflection mirror 14, and irradiates the forward range that is distant enough. Therefore, high-speed traveling becomes possible. On the contrary, in the rain or fog, as shown in FIG. 10, the single filament bulb 12 is moved so that the filament 1*f* of the single filament bulb 12 is suitably located backward (or forward) of the focal point F. Then, since a light 1*g* emitted from the single filament bulb 12 is diffused to the surroundings as shown in FIG. 12, a range 8 on this side and its both sides becomes bright in the shape of a circular arc, while the road surface in the front of this range 8 becomes dark. The position of the single filament bulb 12 in the rain or fog is set to such a position that the road surface 4 in 20–40 m front of the vehicle becomes appropriately dark. A bulb position shown by a dotted line in FIG. 10 shows a bulb position in FIG. 11.

Also in this embodiment, the position of the filament if of the single filament bulb 12 can be changed to the focal point F of the reflection mirror 14 and to the position distant from this focal point, whereby the road surface 4 in 20–40 m front of the vehicle can be darkened and the road surface on the both sides can be lightened. Therefore, the same effects are obtained as those in the first to third embodiments. Further, since the driver can recognize the lane mark for his/her vehicle, the driver can drive more easily.

Needless to say, instead of by moving the single filament bulb 12, the position of the single filament bulb 12 may be changed to the focal point of the reflection mirror 14 and to the position distant from the focal point of the reflection mirror by moving the reflection mirror.

Figure 13:
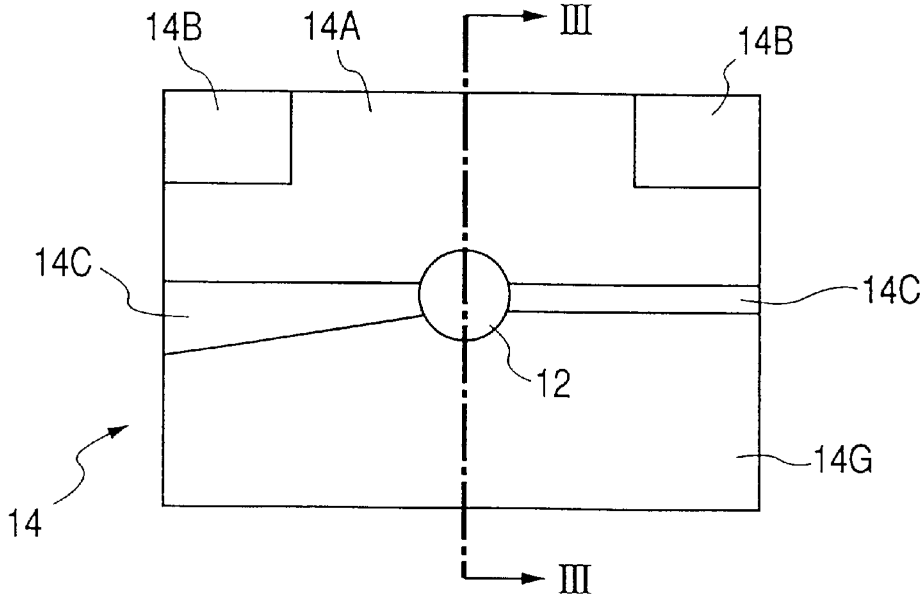
FIG. 13 is a front view of a reflection mirror of a headlamp in a fifth embodiment of the invention.
Figure 14:
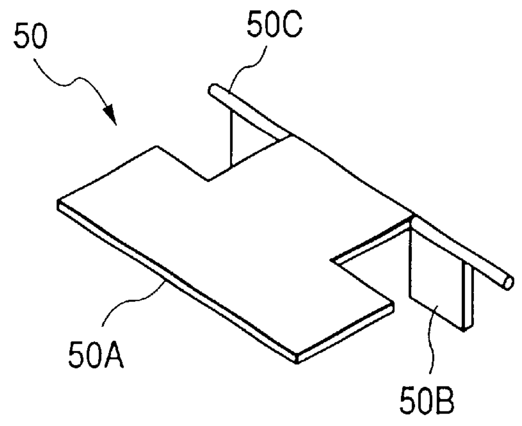
FIG. 14 is a perspective view of a movable shade used in the headlamp of the fifth embodiment.
Figure 15:
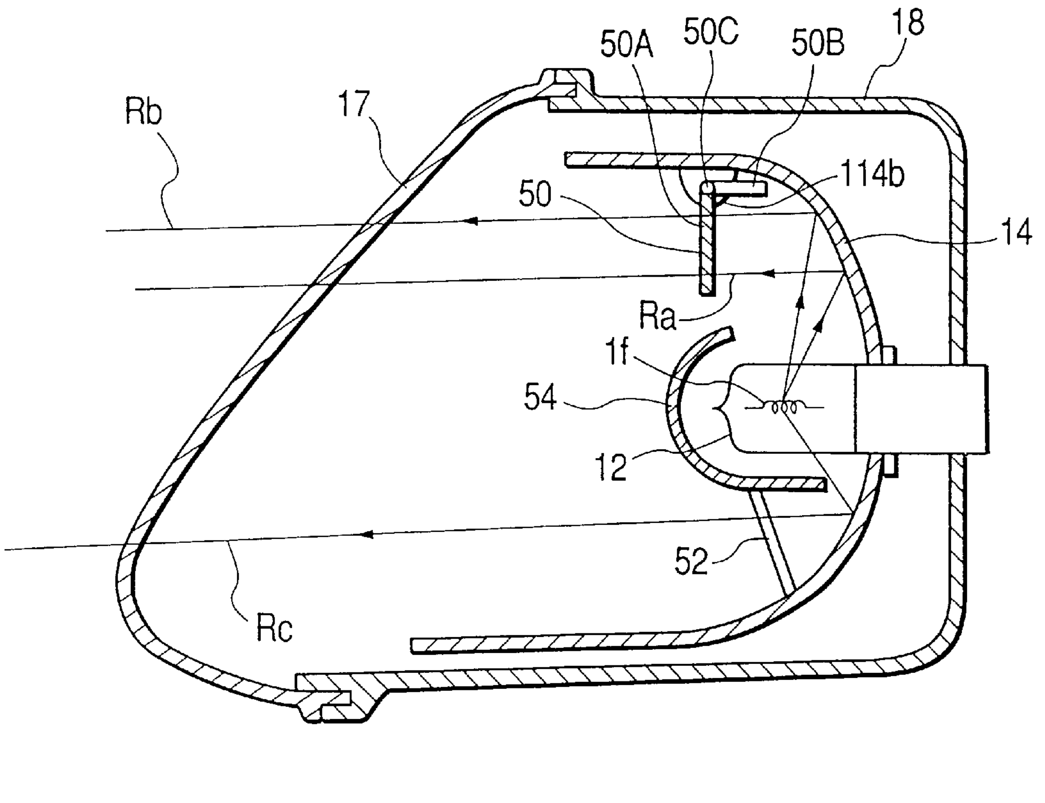
FIG. 15 is a longitudinal sectional view of the headlamp in the fifth embodiment used in the rain or fog, which is taken along a line III—III of FIG. 13.
Figure 16:
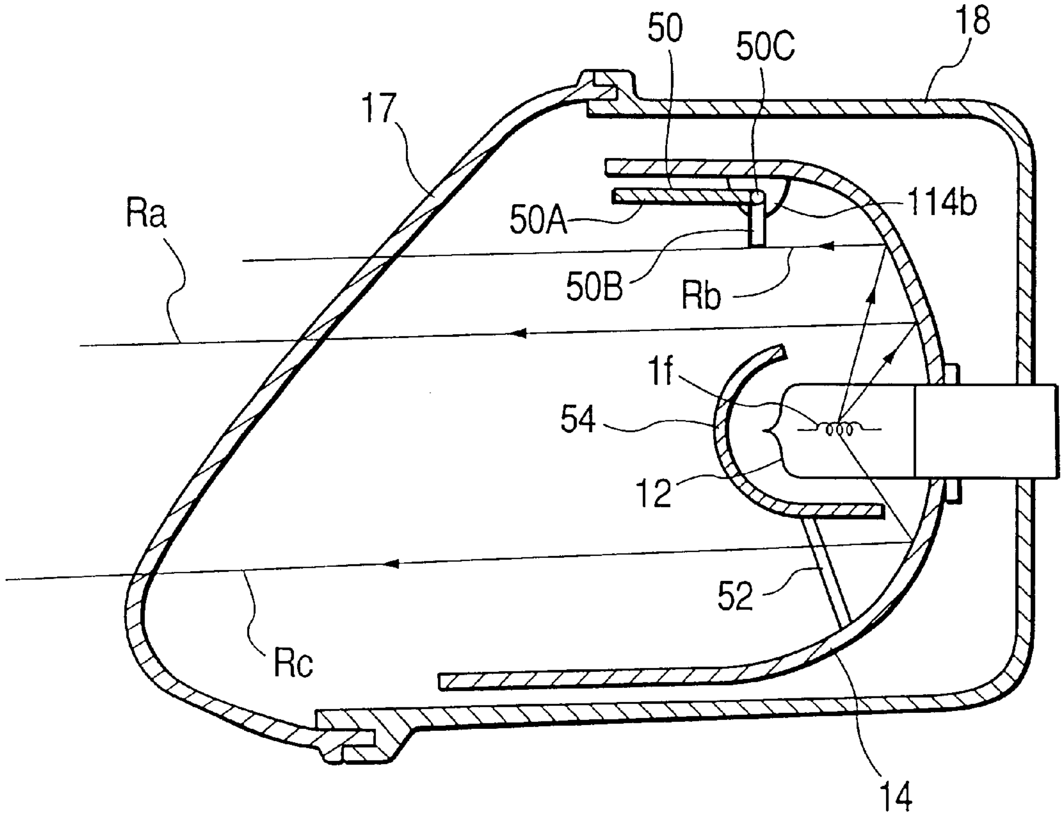
FIG. 16 is the same longitudinal sectional view of the headlamp of the fifth embodiment used in a usual condition.
Figure 17:
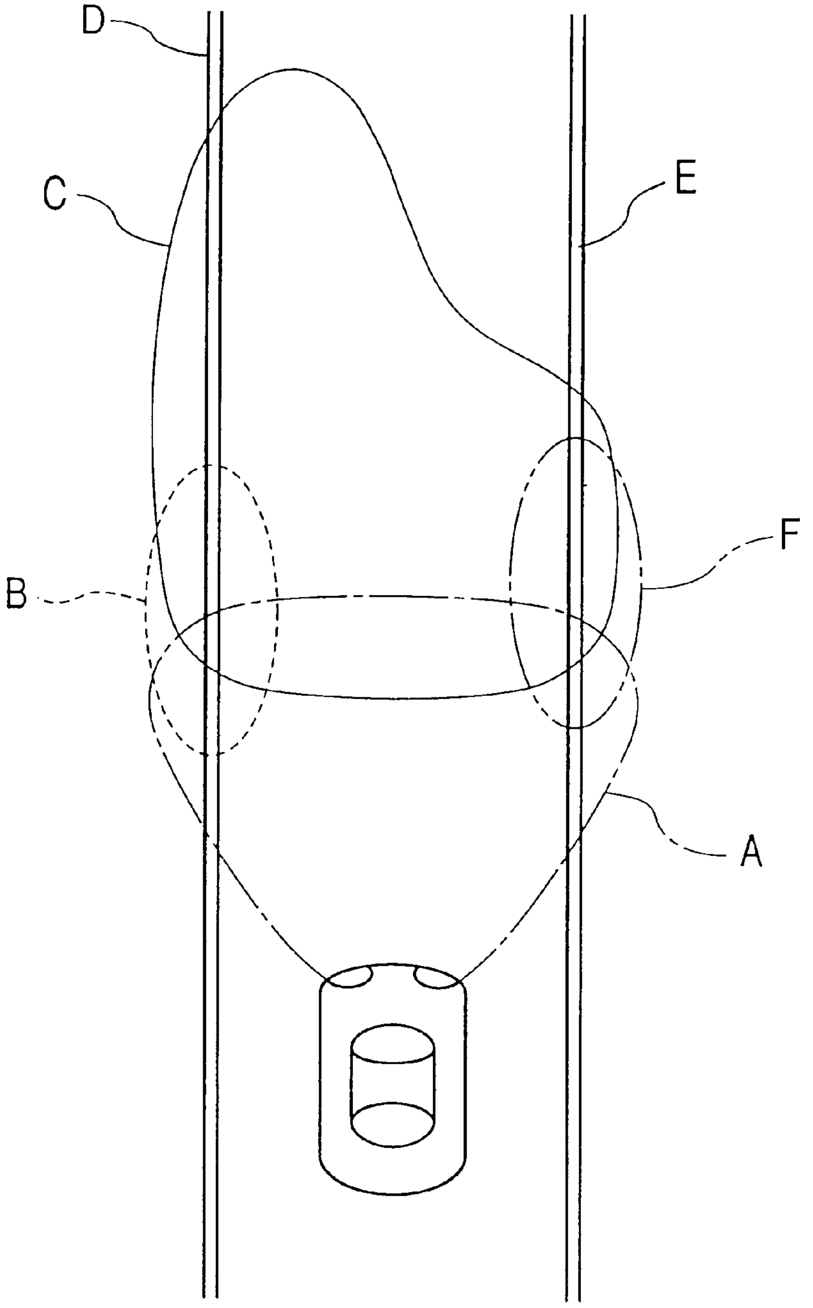
FIG. 17 is a diagram showing a surface irradiation state of the headlamp in the fifth embodiment.

FIGS. 13 to 17 show a fifth embodiment. FIG. 13 is a front view of a reflection mirror of a headlamp in this embodiment, FIG. 14 is a perspective view of a luminous distribution changing means used in this embodiment, FIG. 15 is a longitudinal sectional view of the headlamp in this embodiment used in the rain or fog, which is taken along a line III—III of FIG. 13, FIG. 16 is the same longitudinal sectional view of the headlamp used in a usual condition, and FIG. 17 is a diagram showing a surface irradiation state of the headlamp in this embodiment.

In the headlamp of this embodiment, as shown in FIG. 13, a reflection mirror 14 includes a reflection part 14A that irradiates a portion A (refer to FIG. 17) before a portion in 20 m front of a vehicle, a reflection part 14B that irradiates a portion B (refer to FIG. 17) near a lane mark D at the edge of the road in approximately 10–30 m front of the vehicle, a reflection part 14C that irradiates a distant portion C (refer to FIG. 17), and a part 14G shielded by a shade 54 fixed to the reflection mirror 14 by one or plural legs 52. In this embodiment, both right and left headlamps have the reflection parts 14B that irradiate the lane mark D at the edge (on the left) of the road. However, in this embodiment, the reflection part 14B of the headlamp on the center line E side (on the right) may irradiate a portion F near the center line E (or near the right lane mark) as shown by two-dot chain lines.

As a luminous distribution changing means for shielding a part of the light emitted from a single filament bulb 12 or changing the reflecting direction of the light, a movable shade 50 as shown in FIG. 14 is provided for the reflection mirror 14 portion located above the single filament bulb 12. This movable shade 50 has a T-shaped part 50A for shielding the part 14A that irradiates the portion A before the portion in 20 m front of the vehicle, and a side part 50B for shielding the reflection part 14B that irradiates the lane mark D. The both parts 50A and 50B are coupled to a rotational shaft 50C with crossing at right angles. Further, as shown in FIGS. 15 and 16, this movable shade 50 is rotatably supported by a bracket 114*b* provided on the upper wall on the inner surface of the reflection mirror 14 by the rotational shaft 50C.

When it is fine or cloudy, i.e., in a usual condition, the distant portion C ahead of the vehicle is irradiated with a reflection light Rc from the reflection part 14C. Further, regarding the movable shade 50, as shown in FIG. 16, by an actuator (not shown), the side part 50B is hung down and the T-shaped part 50A is pulled up horizontally. Then, by the action of the movable shade 50, a reflection light Rb from the reflection part 14B that irradiates the portion B near the lane mark D is shielded, so that the portion near the lane mark D becomes dark. Further, a reflection light Ra from the reflection part 14A that irradiates the portion A before the portion in 20 m front of the vehicle is emitted forward, so that the portion A before the portion in 20 m front of the vehicle can be irradiated brightly.

When it is rainy or foggy, similarly to the case when it is fine or cloudy, i.e., in a usual condition, the distant portion C ahead of the vehicle is irradiated with the reflection light Rc from the reflection part 14C. As shown in FIG. 15, the T-shaped part 50A of the movable shade 50 is hung down by the actuator (not shown), and the side part 50B is pulled up horizontally. Then, by the action of the movable shade 50, a reflection light Ra from the reflection part 14A that irradiates the portion A before the portion in 20 m front of the vehicle is shielded, so that the portion A on this side of the portion in 20 m front of the vehicle becomes dark. Further, the reflection light Rb from the reflection part 14B that irradiates the portion B near the lane mark D is emitted forward, so that the portion B near the lane mark D can be irradiated brightly.

Also in this embodiment, by turning the movable shade 50 according to the weather, the same effects are obtained as those in each of the aforesaid embodiments. Further, when it is rainy or foggy, even if the portion A before the portion in 20 m front of the vehicle is darkened, the lane mark D in 10–20 m front of the vehicle is irradiated brightly. Therefore, the automobile lane can be confirmed clearly, and the driver can drive the vehicle more readily. Particularly, in the rain, the surface reflection before the portion A in 20 m front of the vehicle gives glare to the vehicle on the opposite lane. However, in this embodiment, when it is rainy, since the portion is darkened, the glare is seldom given to the vehicle on the opposite lane.

The invention is not limited to the aforesaid embodiments, but there are other various embodiments. For example, as a light source, not only the single filament bulb 12 but also a light source such as a discharge lamp can be used. Further, not by using the actuator 22 but by using a driving means such as a cable, the movable shade 16, the movable reflection mirrors 32, 33, the single filament bulb 12, or the reflection mirror 14 in each of the embodiments may be moved by human power.

As clear from the above description, according to the first to seventh aspects of the invention, when it is rainy or foggy, the forward road surface portion on the both sides becomes visible by darkening a part of the forward road surface. Therefore, the vehicle can run safely also in the rain or fog. Further, this improvement is economical.

Particularly, according to the fifth or sixth aspect of the invention, when it is rainy or foggy, even if a part of the front road surface is darkened, the lane mark for the driver's vehicle can be irradiated brightly. Therefore, the driver can drive the vehicle more readily.

Further, according to the seventh aspect of the invention, when it is rainy, since the portion A in 20 m front of the vehicle is darkened, it is possible to prevent the surface reflection from this portion from giving glare to the vehicle on the opposite lane.

What is claimed is:

1. A headlamp comprising:

a light source;

a reflection mirror supporting said light source;

a light chamber defined by a transparent cover and a lamp body, said light chamber accommodating said light source and said reflection mirror; and a luminous distribution changing member that is movable in front of a portion of the reflection mirror and only over an upper portion of the light source, the luminous distribution changing member shielding a part of light from said light source or changing a reflecting direction of the light, wherein the luminous distribution changing member is movable to a back portion of the reflection mirror when not shielding a part of the light from said light source, and wherein a part of a front road surface is darkened by said luminous distribution changing member.

2. The headlamp according to claim 1, wherein a part of the front road surface is a surface portion in 20–40 m front of a vehicle.

3. The headlamp according to claim 1, wherein a part of the front road surface is located before a portion in 20 m front of a vehicle.

4. A headlamp comprising:

a light source;

a reflection mirror supporting said light source;

a light chamber defined by a transparent cover and a lamp body, said light chamber accommodating said light source and said reflection mirror; and a luminous distribution changing member that is movable in front of a portion of the reflection mirror and only over an upper portion of the light source, the luminous distribution changing member shielding a part of light from said light source or changing a reflecting direction of the light,wherein the luminous distribution changing member is movable to a back portion of the reflection mirror when not shielding a part of the light from said light source, and wherein a reflection part for irradiating a lane mark is provided for a part of said reflection mirror, and when a part of the front road surface is darkened by said luminous distribution changing member, reflection light from said reflection part is emitted to the lane mark.

* * * * *